Dec. 7, 1926.
E. T. FERNGREN
1,609,999
DRAWING SHEET GLASS
Filed Sept. 10, 1923    3 Sheets-Sheet 1
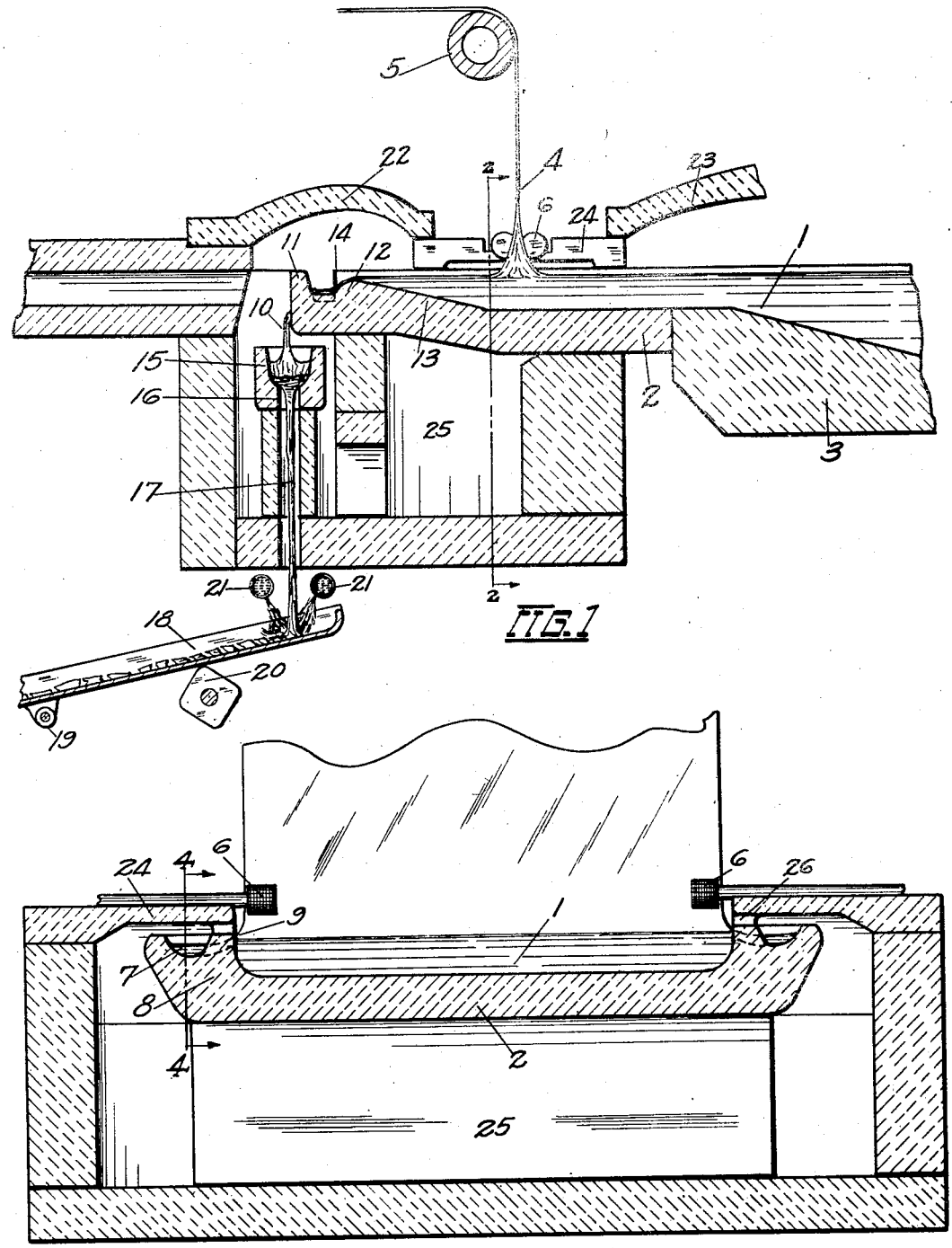
INVENTOR
Enoch T. Ferngren
BY C. A. Rowley
ATTORNEY Dec. 7, 1926.

E. T. FERNGREN 1,609,999

DRAWING SHEET GLASS

Filed Sept. 10, 1923    3 Sheets-Sheet 2

INVENTOR
Enoch T. Ferngren
BY C. A. Rowley
ATTORNEY

Dec. 7, 1926.  
E. T. FERNGREN  
1,609,999
DRAWING SHEET GLASS
Filed Sept. 10, 1923    3 Sheets-Sheet 3
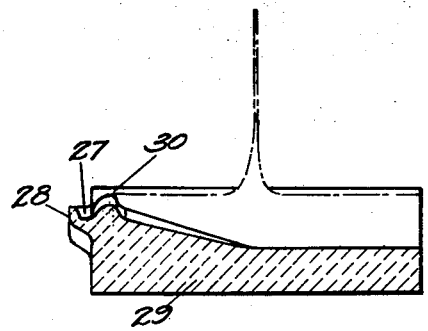
Fig. 6
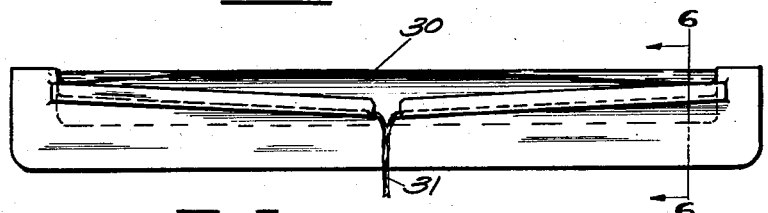
Fig. 5
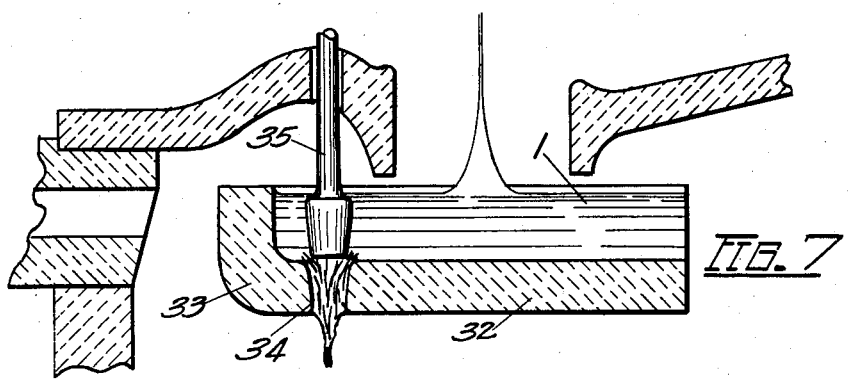
Fig. 7
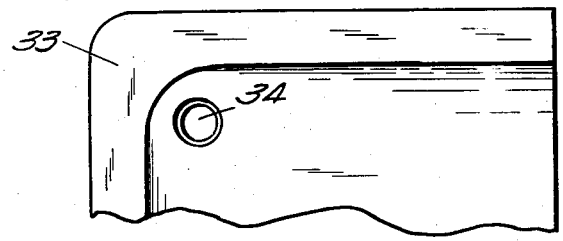
Fig. 8
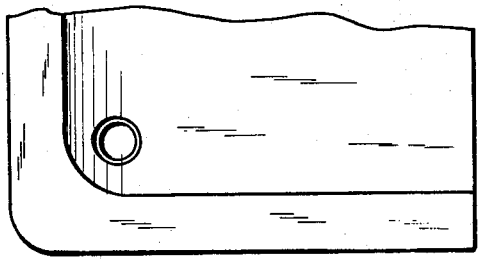
INVENTOR  
Enoch T. Ferngren  
BY C. A. Rowley  
ATTORNEY Patented Dec. 7, 1926.

1,609,999

UNITED STATES PATENT OFFICE.

ENOCH T. FERNGREN, OF TOLEDO, OHIO, ASSIGNOR TO THE LIBBEY-OWENS SHEET GLASS COMPANY, OF TOLEDO, OHIO, A CORPORATION OF OHIO.

DRAWING SHEET GLASS.

Application filed September 10, 1923. Serial No. 661,740.

This invention relates to improvements in the art of drawing sheet glass. The objects of the invention are, more particularly, to facilitate the flow of molten glass to the sheet source, to prevent the stagnation and devitrification of portions of this molten stream adjacent the sheet source, and to simultaneously convert a portion of the molten stream into cullet, which subsequently may be used in the production of molten glass.

In certain forms of sheet glass drawing apparatus previously used, for example, the apparatus disclosed in the patent to Colburn 1,248,809, granted December 4, 1917, the molten glass from which the sheet is drawn is held in a shallow container or draw-pot which is closed at the sides and one end, and in open communication at the opposite end with a tank furance or other source of molten glass. Since all of the molten glass which flows into this container to replenish the supply drawn away in sheet form comes in at one end of the container and at one side of the sheet source, there is a tendency for the glass at the other side of the sheet source, in the closed end of the container, to become more or less stagnant, and sometimes devitrification takes place. Also, the glass at the sides of the container adjacent the sources of the sheet edges is subject to greater cooling influences than the remainder of the molten pool due to the proximity of the cooled sheet edge-forming instrumentalities positioned directly thereabove. There is consequently a tendency for the molten glass adjacent these sheet edge sources to become unduly chilled and devitrified. During the drawing of the sheet there is established a stream movement along a certain defined path within the body of glass in the pot, and the glass which moves in this path continuously supplies the sheet formation, while the glass of the body which lies on the outskirts of this path is very slowly if at all included in the stream movement. It has been found that during a period of about three or four weeks a gradual change occurs in the nature and composition of this glass which is outside of the main current towards the sheet, and that in this space of time there is being built up through the glass from the inner walls of the pot toward the limit of the stream path in the body a formation of exceedingly tenacious and in part devitrified glass which grows to such an extent that it encroaches upon and obstructs the normal path for the glass movement toward the sheet, making it difficult to obtain an even sheet, and causing lines, cords and "dogmetal" defects in the sheet. To overcome these difficulties it becomes necessary to discontinue the drawing operation and "boil out" the pot, an operation which involves much time and labor, and an intense application of heat before normal conditions are restored and the sheet drawing operation renewed.

According to the present invention, the container or conduit for the molten pool is so modified as to provide passages for the overflow or descending discharge of a certain portion of the molten glass from the container at the points most subject to stagnation, as noted above, so that there will be a continual replacement of the molten glass at these positions and the causes of possible devitrification will be eliminated. Thus in the present invention the sheet-supplying current in the supply body of glass is in a way assisted to arrival at the point of sheet formation, by a carrying vehicular stream current including all the glass of the body which is located beyond the limits of the direct sheet-supplying current, thus insuring a constant unimpeded path for the sheet-supplying glass, relieving the drawing tension in said glass, and also making it possible to maintain the glass of the entire supply body in a uniform solutional state, and thereby avoiding the production of much defective sheet glass. Provisions are made to collect the glass which overflows at the several points from the container, and this molten glass is immediately subjected to a rapid chilling treatment whereby it is converted into a friable granular cullet, which latter product is especially desirable as a glass producing material.

Other objects and advantages of the invention will be apparent from the following detailed description of certain approved forms of the apparatus.

In the accompanying drawings:

Fig. 1 is a vertical longitudinal section through one form of the apparatus.

Fig. 2 is a transverse vertical section taken substantially on the line 2—2 of Fig. 1.

Fig. 5 is an end elevation of a modified form of container.

Fig. 6 is a vertical section taken substantially on the line 6—6 of Fig. 5.

Fig. 7 is a longitudinal vertical section through a modified construction.

Fig. 8 is a plan view, partly broken away, of the container shown in Fig. 7.

Figure 3:
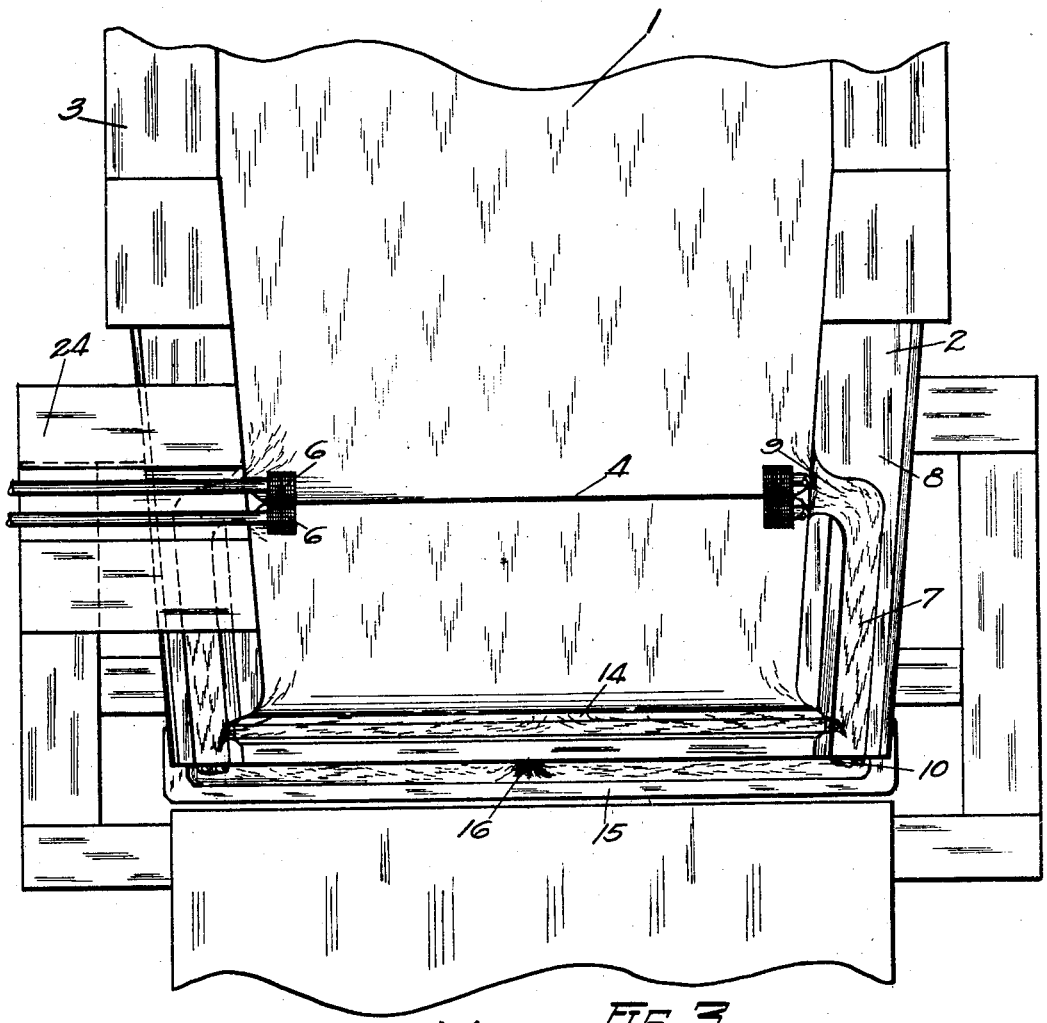
Fig. 3 is a plan view of the apparatus shown in Fig. 1, the cover-tiles for portions of the molten glass in the receptacle being omitted.
Figure 4:
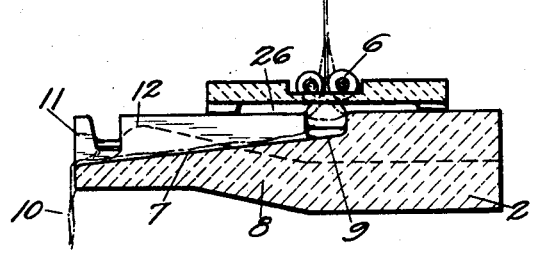
Fig. 4 is a partial vertical section taken substantially on the line 4—4 of Fig. 2.

Referring first to Figs. 1 to 4, inclusive, the molten glass 1 flows into the shallow conduit or container 2 from a tank furnace or other suitable source of molten glass, the discharge end of which is indicated at 3. The adjoining open ends of receptacle 2 and tank 3 are of substantially the same depth so that a free and uninterrupted passage is permitted for the molten glass 1 into the receptacle. The other end and the two sides of receptacle 2 are substantially closed so as to maintain a pool of molten glass within the receptacle, although suitable overflow passages are provided as hereinafter described.

The glass sheet 4 is drawn upwardly from the surface of the molten pool in receptacle 2 by any suitable drawing means, indicated generally at 5. Edge-forming rolls or other instrumentalities 6 engage the sheet edges adjacent their source, to aid in drawing these edges from the molten glass and in maintaining the width of the sheet. These edge-drawing rollers 6 are internally cooled and exert a certain chilling effect on the glass in their vicinity.

Channels 7 are formed in the side walls 8 of receptacle 2. Each of these channels communicates with the pool 1 of molten glass somewhat below the normal glass level, and directly opposite the source of the sheet edge as at 9. Each channel 7 slopes downwardly from the end 9, just described, toward the closed end of the receptacle so that the molten glass which overflows at 9 into these side channels will flow out through the closed end of the pot as at 10. Spaced inwardly a short distance from the closed end 11 of receptacle 2 is a retaining wall 12, whose upper edge is slightly below the normal glass level, the bottom of the pot sloping up to meet this wall 12 as at 13. In this way the pool or stream of glass 1 is made gradually shallower as it approaches the overflow wall 12, so that the stream finally terminates in a shallow cascade of glass 14 which is caught by the channel between walls 11 and 12 and flows therein toward either side of the receptacle where these streams meet and join with the overflow 10 from the side channels 7. The molten streams 10 are caught in a trough member 15, whose glass-holding cavity slopes from either end toward a central orifice 16 from which the glass flows down in stream 17 into a chute 18 positioned beneath the machine.

Chute 18 is supported near one end on a pivot 19 and its other end rests on a rotary cam member 20 which imparts a continuous jolting or shaking movement to the chute 18. Water from one or more pipes 21 is directed upon the stream of molten glass flowing into chute 18, and the chilling effect of this water, in combination with the jolting movement imparted by cam 20, converts the molten glass into granular cullet which slides down the chute 18 into a suitable receiving member.

The surface glass in receptacle 2 at either side of the source of sheet 4 is covered by the arched tiles 22 and 23, and the channels 7 in the side walls of the receptacle are covered by tiles 24 in combination with the tile 22, above described. The receptacle 2 is suitably supported over a heating chamber 25 which keeps the molten glass within the receptacle at the proper temperature. It will be noted that the trough 15, which collects the overflowing molten glass, is located within this heating chamber 25, also that all of the channels through which this overflowing glass passes are located within the heated atmosphere provided by this chamber so that the streams of glass in these passages will remain molten until it flows out into the chute 18. Passages 26 between the cover-tiles 24 and the side walls 8 of receptacle 2 will permit a portion of the heated atmosphere from chamber 25 to flow out over channel 7 onto the surface glass adjacent the sources of the sheet edges to counteract, to some extent, the cooling influence of edge rolls 6 at these points.

A somewhat modified form of receptacle is shown in Figs. 5 and 6. In this case the channel 27 between the outer wall 28 of receptacle 29 and the overflow wall 30, slopes towards its central portion, instead of outwardly as in the form previously described, so that the molten glass which overflows into this channel 27 flows out in a central stream 31, and thence downwardly into chute 18. In this way the trough member 15 previously described may be eliminated. It will be noted that in the form of receptacle shown in Figs. 5 and 6, the overflow wall 30 is higher at its center than adjacent the sides of the receptacle so that the overflowing stream of glass will be deeper at its side edges where the increased glass replacement movement is most desired.

A still different form of apparatus embodying some of the features of this invention is shown in Figs. 7 and 8. In this case the bottom of receptacle 32 is provided adjacent its outer closed corners 33 with passages 34 through which a portion of the molten stream 1 may flow out to prevent the accumulation of stagnant glass at the closed end of the receptacle. Plunger or stop members 35 project down, into or slightly above these passages 34 to control the outward flow of glass at these points. The plungers 35 may be reciprocated at intervals in any suitable manner, or may be permanently positioned above the passages 34 so as to permit a constant flow of desired volume through these passages.

It will be seen that with any of the forms of this improved apparatus, the flow of glass into the draw-pot or receptacle is continued beyond the sheet source, and a constant replenishing movement takes place at the points which would be more or less stagnant were it not for the overflow passages provided. The sideward flow of glass through channels 9 also aids in maintaining the width of the sheet source and consequently the width of sheet 4. The overflowing molten glass which is not drawn into the sheet is not a loss, as it is quite desirable to form a certain amount of granular cullet to be used as a portion of the batch with which the tank furnace is replenished. It has been found that a batch containing a large percentage of this kind of cullet is most efficient for producing the quality of molten glass best adapted for drawing into sheet form.

Claims:

1. In a sheet glass drawing apparatus, a container for the molten glass from which the glass sheet is drawn, the container being in open communication at one end with a source of molten glass, and having overflow passages at the other three sides, in combination with means for converting into cullet the glass which overflows from the container.

2. In sheet glass apparatus, a tank furnace containing a mass of molten glass, a draw-pot in open communication therewith, the wall at the closed end of the draw-pot being of such a height as to permit a constant overflow of glass from the said draw-pot, and means for drawing a sheet from the glass in the draw-pot.

3. In sheet glass apparatus, a tank furnace containing a mass of molten glass, a draw-pot in open communication therewith, the wall at the closed end of the draw-pot having a shape to permit a constant overflow of waste glass, and means to draw a sheet from the glass in the draw-pot, the overflow of waste glass preventing stagnation of unused glass in the draw-pot.

4. In sheet glass apparatus, a tank furnace containing a mass of molten glass, a draw-pot in open communication therewith, means to draw a sheet therefrom, means to permit an overflow of glass from the pot at the ends of the sheet being formed, and means to permit an overflow at the closed end of the pot.

5. In sheet glass drawing apparatus, a tank furnace containing a mass of molten glass, a draw-pot in open communication therewith, means for drawing a sheet therefrom, means arranged at the edges of the sheet for holding the same to width, and means to permit an overflow of the glass directly beneath the said width means to prevent an accumulation of chilled glass.

6. In sheet glass drawing apparatus, a tank furnace containing a mass of molten glass, a draw-pot in open communication therewith, means for drawing a sheet therefrom, means arranged at the edges of the sheet for holding the same to width, and means to permit an overflow of the glass directly beneath the said width means to prevent an accumulation of chilled glass, and the end of the container having means to permit a constant overflow of the glass not drawn into the sheet.

Signed at Toledo, in the county of Lucas and State of Ohio, this 6th day of September, 1923.

ENOCH T. FERNGREN.